Figure 1A:
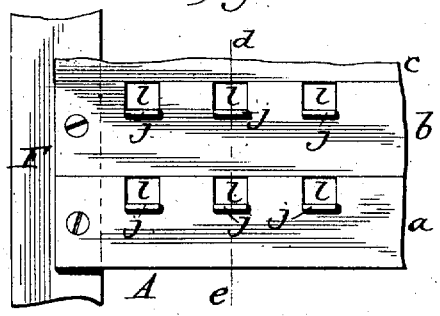

3 Sheets—Sheet 1.

M. G. KELLOGG.

MULTIPLE SWITCHBOARD FOR TELEPHONE EXCHANGES.

No. 11,529. Reissued Apr. 7, 1896.

Attest.

Sidney P. Hollingsworth

Battas D. Long

Inventor.

MILO G. KELLOGG by his attorneys

Baldwin, Davidson & Wight

THE NORRIS PETERS CO., WASHINGTON, D. C.

M. G. KELLOGG.
MULTIPLE SWITCHBOARD FOR TELEPHONE EXCHANGES.
No. 11,529. Reissued Apr. 7, 1896.
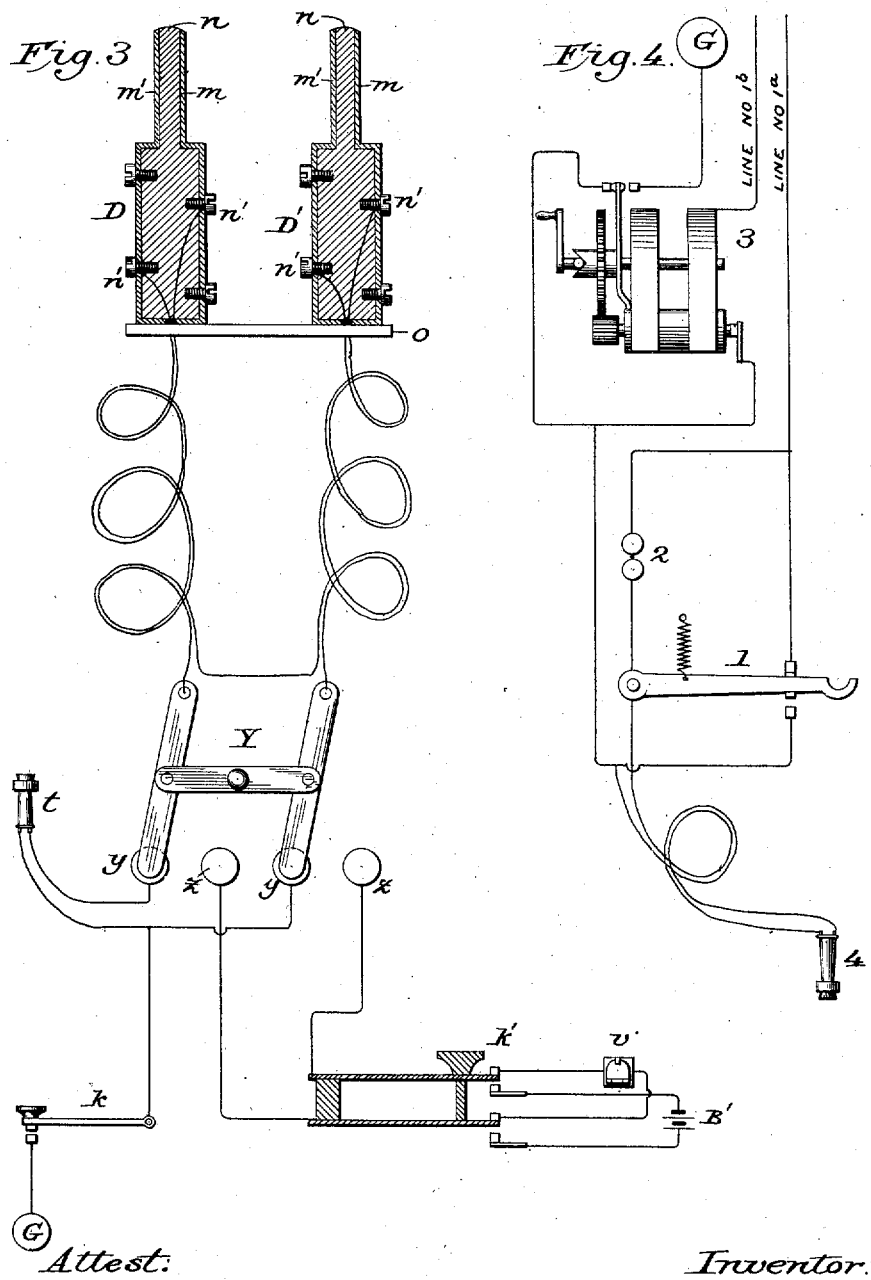
Attest:
Sidney R. Hollingsworth
Battus D. Long
Inventor:
MILO G. KELLOGG
by his attorneys.
Baldwin, Davidson & Wight.
THE NORRIS PETERS CO., WASHINGTON, D. C.

M. G. KELLOGG.

MULTIPLE SWITCHBOARD FOR TELEPHONE EXCHANGES.

No. 11,529. Reissued Apr. 7, 1896.

Attest:

Sidney P. Hollingsworth

Baltus De Long

Inventor:

MILO G. KELLOGG by his attorneys

Baldwin, Davidson & Wight

THE NORRIS PETERS CO., WASHINGTON, D. C.

UNITED STATES PATENT OFFICE.

MILO G. KELLOGG, OF CHICAGO, ILLINOIS.

MULTIPLE SWITCHBOARD FOR TELEPHONE-EXCHANGES.

SPECIFICATION forming part of Reissued Letters Patent No. 11,529, dated April 7, 1896.

Original No. 386,886, dated July 31, 1888. Application for reissue filed July 22, 1890. Serial No. 359,569.

*To all whom it may concern:*

Be it known that I, MILO G. KELLOGG, of Chicago, in the county of Cook and State of Illinois, temporarily residing at Stuttgart, in the Empire of Germany, have invented certain new and useful Improvements in Multiple Switchboards for Telephone-Exchanges, of which the following is a full, clear, concise, and exact description, reference being had to the accompanying drawings, forming a part of this specification.

My invention relates to a telephone-exchange system in which the subscribers' lines are metallic circuits and in which one of the wires of a metallic circuit is normally grounded at the central office and the other wire is normally open at the central office.

It consists, first, of a multiple-switchboard system of operating an exchange and testing at any board to determine whether any given line is in use, which system I shall hereinafter describe and claim in detail.

It consists, secondly, of an operator's central-office system of cords with plugs, switches, keys, telephone, battery or generator, clearing-out annunciators, and circuits for answering, calling, testing, switching, and clearing out subscribers' lines, which I shall hereinafter describe and claim in detail, said system being applicable to said multiple-switchboard system mentioned above and to other systems of telephone-exchange switchboards.

It consists, thirdly, in an arrangement of subscribers' station apparatus and in a system of calling from the subscribers' stations to the central office, which I shall hereinafter describe and claim in detail, said arrangement of subscribers' station apparatus and system of calling being applicable to said test system mentioned above and to other systems of testing. Said test system is applicable to other systems of calling and is applicable to other operators' central-office systems of cords and apparatus than the systems mentioned above and hereinafter described.

In carrying out my test system I place in the common ground wire or connection of the lines at the central office an electric battery or source of electric current or energy and switching apparatus by which each line is disconnected from its normal ground connection through the battery when it is switched for use. I also provide test-receiving instruments, one at each board, and apparatus and connections by which each instrument grounded on one side may for testing be connected on its other side to the normally open end of any line at its board. When, therefore, the test of any line is made and the line is not switched at any board, there is a complete circuit established from the ground through the test-battery to the line and through the circuit of the line to the test-receiving instrument used in testing and through the instrument to the ground, and the operator hearing the instrument sound or respond will know that the line is not switched at any board, and therefore that it is free to be connected to. If, however, when the test is made the line is switched at any board, the test-circuit, which has been described, will be open and the operator will hear nothing from the test-receiving instrument, and thereby will know that the line is switched for use at some board.

In carrying out my call system I place for each metallic circuit an annunciator in the circuit of the wire which is normally grounded at the central office and I leave the circuit of the line normally open to the ground at the subscriber's station. I provide a key or switch-closing apparatus by which the line is grounded at the subscriber's station while he is sending a call to the central office, and I place the calling-generator so that when operated it will be between such ground connection and the normal ground connection of the line at the central office. The subscriber can therefore, when his line is not in use, send a signal to the central office which will operate his line-annunciator.

My calling system will coöperate or work in connection with other test systems, and my test system will in turn coöperate or work together with other systems of calling in telephone-exchanges.

In my system I place as many switchboards in the central office as are found necessary or desirable in order to properly answer the calls and connect and disconnect the subscribers' lines. On each board I place for each telephone-line which centers at the office a spring-jack or similar switch having two insulated contact-points normally in contact, and a third contact point or piece normally insulated from the others, except by the line connections, said switch being adapted to receive a switch-plug, and when the plug is inserted to disconnect the switch-points which are normally in contact and connect one of them to one of the insulated metal pieces of the plug, and at the same time connect the other metal piece of the plug to the third contact point or piece mentioned above.

The third contact point or piece of the switch above described is also placed and arranged so that the operator may at will apply a test-plug or other test device to it. A separate test bolt or piece might, however, be used for each line on each board, providing it was connected to the open end of its line.

The switches of a line on the different boards may be called "a series of switches," and the test-pieces of a line, or the contact-points when used as test-pieces, may be called "a series of test bolts or pieces."

Figure 1B:
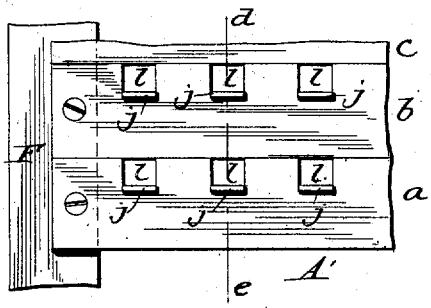
Figure 2:
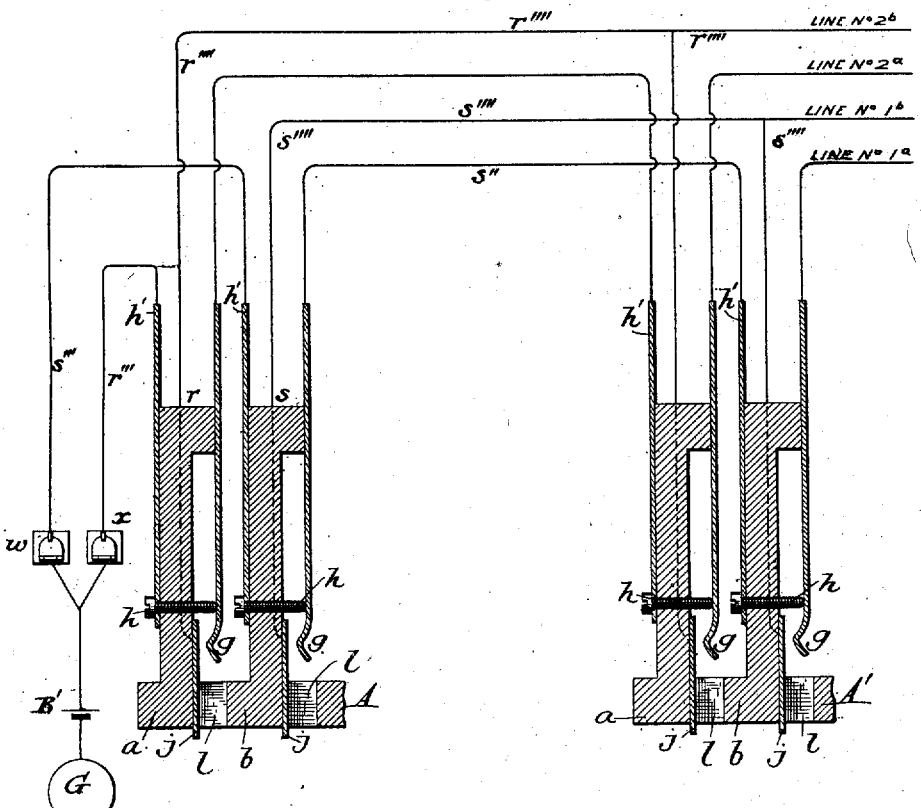
Figure 5:
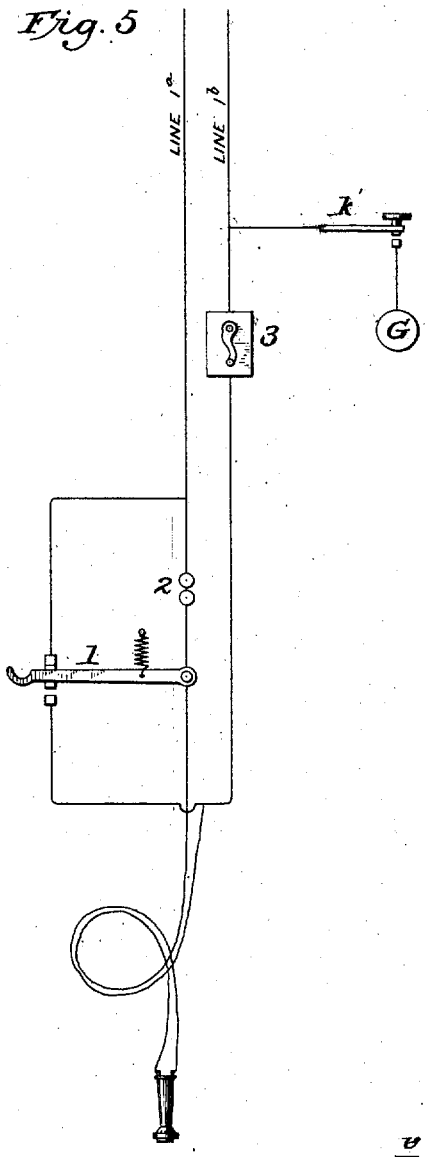
Figure 6:
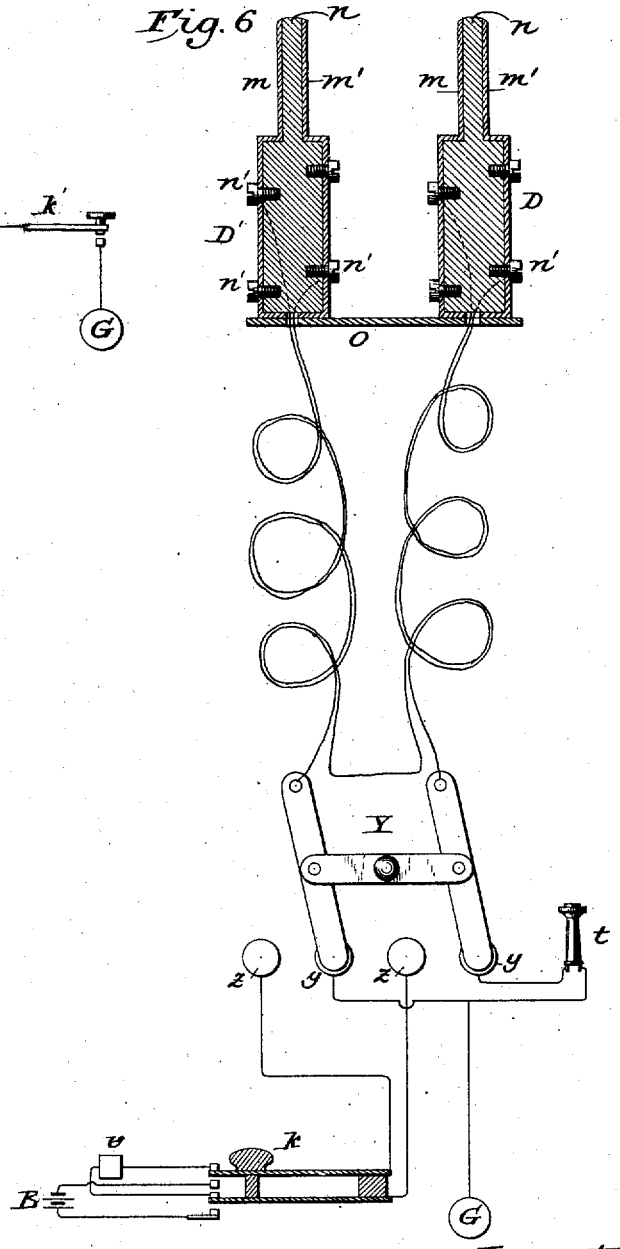

Figures 1ª and 1ᵇ of the drawings are front views of sections of two multiple switchboards to which the same wires are connected. Fig. 2 shows a diagram of the boards and the circuits and connections necessary to operate them when used in connection with the operator's cord system and the subscriber's station apparatus hereinafter described. Fig. 3 is a diagram of the operator's cord system, and Fig. 4 is a diagram of the subscriber's station apparatus. Fig. 5 shows a modification of the subscriber's station apparatus, and Fig. 6 shows a modification of the operator's cord system.

In the drawings like parts and apparatus are indicated by the same letters and numerals of reference.

In Fig. 2, A is a sectional view of the switchboard shown in Fig. 1ª, as indicated by line *d e*, and A′ is a sectional view of the switchboard shown in Fig. 1ª, as indicated by line *d e*.

*a b* represent rubber strips of the shape substantially as shown, on which the metal parts of the spring-jack switches are mounted. These strips may be of a length to receive any convenient number of spring-jack parts.

*l l*, &c., are square holes through the fronts and at the edges of the strips, adapted to receive the switch-plugs. The contact-springs *g g*, &c., are mounted to the rear of and are parallel to the holes *l l*, &c., to which they belong, as shown. The contact-points *h h*, &c., corresponding to the contact-springs, pass through the rubber strips and have connecting-pieces *h′ h′*, &c., as shown.

*j j*, &c., are the contact-pieces of the switches, insulated from the rest of the parts, except by line-wires, each adapted to connect one side of its line to one of the contact-pieces of the plug when the plug is inserted into the switch, and also to be a test-bolt of its line at its board. The switch-plugs are substantially as shown in Fig. 3 and as will hereinafter be described.

The several parts mentioned above are so made, shaped, arranged, and adjusted that when a plug is inserted into any of the switch-holes it raises the spring in the rear of the hole from its contact-point, (on which it normally rests,) and the spring is connected to one of the contact-pieces of the plug, while the other contact-piece of the plug is connected to the contact-piece *j* of the switch which is being used.

Each section of a rubber strip, with its contact-spring, contact-point, contact-piece, and the hole, all arranged and operating as shown, may be considered as a spring-jack switch. The rubber strips are placed one above the other, as shown. The lower edge of one strip therefore provides the upper edges of the holes of the strip which is below it, as shown. It is not necessary that the switch-holes should be actually square, as their shape might be made to conform to the shapes and arrangement of the parts used.

B′ is a test-battery in the common ground-wire.

The circuits and connections of a subscriber's metallic line to its series of switches are as follows and as shown: I have marked the ingoing and the outgoing wires of such a line as line "No. 1ª" and line "No. 1ᵇ." S and S′ are the switches for this line on the two boards. Line No. 1ª after entering the office passes first to spring *g* of switch *s′*, and thence through contact-point *h* and connecting-piece *h′* of that switch and wire S″ to spring *g* of switch S, and thence through contact-point *h* and connecting-piece *h′* of that switch and wire S‴ to annunciator *w*, and thence to the common ground-wire and through the battery B′ to the ground. Line No. 1ᵇ is connected to the contact-pieces *j j* of the switches S and S′ by wire S⁗ and its branches, (also marked S⁗,) as shown. I have marked the two wires of another subscriber's metallic-circuit line as line "No. 2ª" and line "No. 2ᵇ," and they are connected to their switches *r* and *r′*, as shown, and similar to the above. In like manner would the other lines of the exchange be connected to their switches and the ground.

Other boards might be added to the exchange, and the connection of the lines to their switches would be similar to the above and such as would be evident to those skilled in the art.

In the operator's system of cords shown in Fig. 3 only one pair of cords, with its plugs, switch, keys, clearing-out annunciator, telephone, and calling battery or generator is shown. Other pairs with their parts could be added and connected in a manner which is apparent to those skilled in the art. One system of pairs of cords is placed at each board for an operator, and the parts are so mounted that the operator can conveniently operate the board.

D D′ represent a pair of plugs in sectional view. *n* is the rubber insulation of the plug. *m* is one of its contact-pieces, and *m′* is the other contact-piece. The contact-pieces *m m′* extend to the bottom of the plug, as shown, and are adapted to rest normally (or when the plug is not in use for switching) on the metal piece *o*, which thereby connects them temporarily together.

Weights, as is usual, or similar devices may be used to bring the plugs to the strip *o* and form a good connection.

J is a looping-in switch, having two pairs of contact-bolts *y y* and *z z*, on which the operator may at will place the levers of the switch.

*v* is the clearing-out annunciator of the pair of cords.

K′ is a looping-in key, constructed substantially in the manner as shown, whereby the operator may at will loop her calling-generator into the circuit of a pair of cords.

B is the operator's calling-generator, *t* is her telephone, and K is a test-key.

The cords have two insulated conductors, as shown, and should be long enough so that the operator may connect any plug with any switch at her board. Each operator needs but one calling-generator, one telephone, and one test-key for her system. She should have as many looping-in switches and as many looping-in keys as she has pairs of cords. The circuits are substantially as shown.

The testing-key may be dispensed with, and in that case the wire which is shown as branching off from one of the telephone-cords may connect directly to the ground. Fig. 6 shows such a modification of the apparatus.

In the subscriber's station apparatus shown in Fig. 4, 1 is the telephone-switch, 2 is the signal-bell, 3 is the calling-generator, and 4 is the subscriber's telephone. These parts may be the usual forms of apparatus and are connected as shown and in other known ways. The calling-generator is, however, modified, as will hereinafter be described. Wire No. $1^a$ and wire No. $1^b$ (shown in this figure) are the two wires of a metallic-circuit line.

The generator has an automatic device (shown in the drawings) by which when the crank is not in motion the wire of the armature is shunted and the line is disconnected from the ground at the subscriber's station, and when it is turned or operated the shunt is automatically removed from the armature and the line is temporarily connected to the ground.

The automatic device shown is a modification of a form very generally used, the modification being substantially in the arrangement of the contacts. It contains a V-shaped attachment to the hub of the driving-wheel, a pin in the shaft which engages in the V-shaped arrangement, and a spring which presses against the wheel and brings the pin normally in the center of the V arrangement. The contact-points and circuits are substantially as shown and as will produce the action described above. Other devices may be used, modified so as to produce this result. A common key or switch might be used and operated by the hand of the subscriber to ground the line when he is sending in a signal. The generator should be connected so that the temporary ground is made between the normally open end of the subscriber's line and the armature-coil. This modification of the apparatus is shown in Fig. 5, in which K′ is the key or switch referred to as operated by the hand of the subscriber.

The operation of the system is as follows: When a subscriber desires to call, he turns the crank of his generator and, thereby temporarily connecting his line with the ground and sending a calling-current over it, operates the line-annunciator at the central office. The subscriber then removes his telephone from its hook or switch, and the operator places D′, one plug of a pair of plugs, in the switch of the line where a call is indicated, and, placing the levers of the switch Y corresponding to this pair of plugs on its bolts *y y*, the subscriber and the operator are connected together in metallic circuit for conversation. When the operator finds out by conversation what line is wanted, she tests the line wanted, as will hereinafter be indicated, to find out whether or not it is in use. If she finds it is not in use, she places the other plug of the pair of plugs used in the switch of the line at her board. The two lines are thereby connected together in metallic circuit, and they are disconnected from their normal ground connection through the test-battery. She will then move the levers of the switch Y so that they rest on bolts *z z*, and, pressing on key K′, loop the calling-generator temporarily into the circuit. When she removes the pressure from the key K′, the clearing-out annunciator will be in the circuit. Thus the subscribers are connected together in metallic circuit, are called, and are left for conversation with a clearing-out annunciator in their circuit. The operator can always, by moving the levers of the switch Y to *y y*, listen on her telephone to ascertain whether the subscribers are through conversation. When the subscribers are through conversation, either one can turn the crank of his generator and send a clearing-out signal through the metallic circuit, which will operate the clearing-out annunciator left in the circuit. The automatic attachment of the generator will of course ground the circuit while the subscriber is sending in the clearing-out signal; but this will not prevent its operation.

The testing operation is as follows: When the operator has placed one plug of a pair of her switch-plugs in the switch of a line which has called and has found out by conversation what line is wanted, she, for testing, places the piece *m′* of the other plug of the pair on the contact-piece *j* of the switch of the line wanted, pressing meanwhile on the key K′. If the line tested is not in use or unswitched at any board, there will be a complete circuit from the ground at the central office through the operator's telephone, thence through the contact-piece *j* and the line back to the central office and to ground, and the test-battery will be in that circuit, and the operator, hearing a click in her telephone, will know that the line is not switched. If, when the operator had made the test as above described, the line tested had been switched at any board, it would have been disconnected from its ground connection through the test-battery, and she would not have gotten the signal that the line was not busy and would not have completed the connection.

When a pair of plugs are not in use, the levers of the switch Y corresponding to them should rest on *z z*.

The test-battery B′ is of course so related to the line-annunciator and to the test-receiving instrument that when a test is made and the test-circuit is completed the line-annunciator is not operated, but the test instrument responds.

Prior to my invention John A. Seely, of New York, had invented a multiple-switchboard system for metallic-circuit lines in which one of the wires of the metallic circuit is normally grounded at the central office and the other wire is normally open at the central office. This system is shown in the patent of Seely, No. 357,540, dated February 8, 1887.

In Seely's organization mentioned above the lines are for his signaling system to the central office grounded at the subscribers' stations normally or when they are not in use. This ground connection is made by means of contacts placed on the telephone-switch. The generator at the subscriber's station and the line-annunciator at the central office are placed in the circuit between the normal ground connections at the subscriber's station and the central office. In my organization, on the other hand, the lines are for signaling left normally open to the ground at the subscriber's station and are grounded there while the calling-generator is being operated.

In Seely's organization the subscriber's battery is in the circuit of the line while his telephone is not switched for use, but is short-circuited while the telephone is switched for use, so as not to send any appreciable current over the subscriber's metallic circuit. The test-circuit is from the ground through the operator's telephone to the line and through the subscriber's battery (when his telephone is not switched for use) to the normal ground connections of the line both at the subscriber's station and at the central office. The test indicates whether or not the subscriber's telephone is switched for use and does not indicate whether or not the line is switched for use at the central office. In my test system, on the other hand, the lines are normally grounded at the central office through the test-battery and are disconnected from such ground connection through the battery while they are switched at any board for conversation, and the test indicates whether or not the lines are switched at any board.

My test system, which indicates whether or not the lines are switched at the central office, is preferable to a system like Seely's, which merely indicates whether or not the subscriber's telephone is switched for conversation. Subscribers frequently place their telephones on their switches when they are through conversation without sending a clearing-out signal, and in a test system which indicates merely whether the subscriber's telephone is switched or not a line will frequently test "free" and be connected to when it is already switched with another line at the central office, causing confusion both to the subscribers and to the operators. Lines in this condition are technically called "tied up." In my test system this source of trouble does not exist.

I claim as my invention, and desire to secure by Letters Patent—

1. In a telephone-exchange system, a metallic-circuit subscriber's line normally disconnected from the ground at the subscriber's station, in combination with a calling-generator in the circuit of said line at the subscriber's station and a switch coöperating with the normally open ground to close the same while the generator is being operated.

2. In a metallic-circuit exchange system, a subscriber's line normally disconnected from the ground at the subscriber's station and normally connected with the ground wire or connection at the central office and a calling-annunciator in said ground wire or connection, in combination with a calling-generator at the subscriber's station in the circuit of said line, a ground wire or connection at the subscriber's station normally open to the line, switching devices or means at the central office to temporarily disconnect said line from said ground wire or connection at the central office and connect it with another line for conversation, and switching devices or means at the subscriber's station to temporarily connect said line with said ground wire or connection at the subscriber's station while the generator is being operated with the generator between the ground connection and the calling-annunciator.

3. In a telephone-exchange system, a metallic-circuit line normally disconnected from the ground at the subscriber's station, one side or branch of which is normally connected to a ground wire or connection at the central office, the other side or branch of which is normally open at the central office, and a battery in said ground wire or connection, in combination with a switching device at the central office having a pair of contact-points to disconnect said line at the will of the operator, from said ground wire or connection, a test-receiving instrument and a switch-testing plug or device connected to one side of said test-receiving instrument, whereby the operator may at will connect said test-receiving instrument, grounded on one side, on its other side to said open end of said metallic-circuit line, substantially as set forth.

4. In a telephone-exchange system, a metallic-circuit line normally disconnected from the ground at the subscriber's station, a ground wire or connection at the central office, a battery in said ground wire or connection and a switch at the central office having three contact-pieces, two of which are normally in contact with each other and are not in contact with the third piece, one of said pieces which are normally in contact being connected to said ground wire or connection with the battery between it and the ground, the other of said pieces being connected to one side or branch of said metallic-circuit line, and the other side or branch of said line being connected to said third contact-piece, in combination with a double-switch plug having two insulated contact-pieces adapted to be inserted into said switch, and when inserted to disconnect the contact-pieces of the switch which are normally in contact and connect the two contact-pieces which are connected to the two sides or branches of the line to the two insulated pieces of the plug (one piece of the plug to one piece of the switch and the other piece of the plug to the other piece of the switch), a test-receiving instrument at the central office, and switch-testing devices or means whereby an operator may at will connect said instrument, grounded on one side, on its other side to said third contact-piece connected to said open end of the line.

5. In a telephone-exchange system, a metallic-circuit line normally disconnected from the ground at the subscriber's station, one side or branch of which line is normally connected to a ground wire or connection at the central office and the other side or branch of which is open at the central office, and a battery and a calling-annunciator in said ground wire or connection, in combination with a calling-generator at the subscriber's station in said line, means for grounding said line at the subscriber's station when the generator is being operated with the generator between that ground connection and the office-ground, a test-receiving instrument, and switch-testing devices or means whereby an operator may at will connect said instrument, grounded on one side, on its other side to said open end of the line.

6. In a multiple-switchboard system, the combination with a metallic-circuit telephone-line extending to switches at the several boards, of a branch to ground adapted to be connected to one branch or side thereof, a battery in circuit with said line and a grounded operator's testing set adapted to be connected with the line whereby a test may be made at any board to determine whether the line is busy.

7. A metallic-circuit telephone-line extending in two sides or branches from a subscriber's station to the central office, one of said branches or sides being open at the switchboard and the other branch including the spring and contact of a spring-jack switch and a test-battery and extending from the test-battery to ground in combination with switching devices at the central office to disconnect the grounded side of said line from the test-battery and to unite said metallic circuit with another telephone-line for conversation.

8. In a telephone-exchange system a metallic-circuit line, one side or branch of which is normally connected to a ground wire or connection at the central office, the other side or branch of which is normally open at the central office, and a battery in said ground wire or connection, in combination with a switching device at the central office having a pair of contact-points to disconnect said line at the will of the operator from said ground wire or connection, a test-receiving instrument, and a switch-testing plug or device connected to one side of said test-receiving instrument, whereby the operator may at will connect said test-receiving instrument, grounded on one side, on its other side to said open end of said metallic-circuit line, substantially as set forth.

9. In a telephone-exchange system, two or more multiple switchboards, metallic-circuit lines connected thereto, one side or branch of each line being normally connected at the central office to a ground wire or connection, and the other side or branch being normally open at the central office, and a battery in said ground wire or connection in combination with switching devices or means to temporarily disconnect the branch of said line from its ground wire or connection, and to connect the two branches with the two branches of another line for conversation, test-receiving instruments, one at each board, and switch-testing devices or means at each board, whereby an operator may, at will connect her test-receiving instrument, grounded on one side, on its other side to the open end of any of said metallic-circuit lines, substantially as and for the purpose set forth.

10. In a telephone-exchange system, a metallic-circuit line, one side or branch of which is normally grounded through the line-annunciator at the central office, in combination with a test-receiving instrument at the central office grounded on one side, a switch-testing plug or device to connect said instrument on its other side to the other side or branch of the line, said side or branch being open to the ground, and thereby establish a test-circuit when the line is not switched, from the ground of the instrument through the metallic circuit of the line to the normal ground of the line, a battery in said test-circuit, and a switching device containing a pair of contact-points in the circuit of said side or branch of the line which is normally grounded, whereby an operator may at will disconnect the line from its normal ground, the battery, annunciator and test-receiving instrument being so related that the latter responds to the battery but the annunciator does not, substantially as set forth.

11. In a telephone-exchange system, a metallic-circuit line one side or branch of which is normally grounded at the central office through the line-annunciator and test-battery and the other side or branch of which is normally open at the central office, in combination with switching apparatus to open such ground connection while the line is switched for conversation, and a test-receiving instrument grounded on one side and connected on its other side to a plug or device adapted to be brought into connection with the open side or branch of the line, the battery, annunciator and test-receiving instrument being so related that the latter responds to the battery but the annunciator does not, substantially as set forth.

12. In a telephone-exchange system, a metallic-circuit line, one side or branch of which is normally connected through the line-annunciator to one side of a test-battery at the central office and the other side or branch of which is normally open at the central office, in combination with switching apparatus to open such normal connection between the line and the battery when the line is switched for conversation and a test-receiving instrument connected on one side to the other side of said battery and on its other side to a plug or device adapted to be brought into connection with the open side or branch of the line, the battery, annunciator and test-receiving instrument being so related that the latter responds to the battery but the annunciator does not, substantially as set forth.

13. In a multiple-switchboard system, the combination with a metallic-circuit telephone-line extending to switches at the several boards, of a branch connection adapted to be connected to one branch or side thereof, a battery in circuit with said line, and an operator's testing set connected on one side to said branch connection adapted to be connected with the line whereby a test may be made at any board to determine whether the line is busy.

14. In a telephone-exchange system, a metallic-circuit line normally connected at the central office through the line-annunciator with one side of a test-receiving instrument and disconnected from it while switched for conversation, in combination with a plug or device connected to the other side of said test-receiving instrument and adapted to be brought for testing into connection with a test contact-piece permanently connected with said line, and a battery in the test-circuit thus established, the battery, annunciator and test-receiving instrument being so related that the latter responds to the battery but the annunciator does not, substantially as set forth.

15. In a telephone-exchange system, a metallic-circuit line normally connected through the line-annunciator or with the ground at the central office and disconnected from the ground while switched for conversation, in combination with a test-receiving instrument grounded on one side, a switch-testing plug or device adapted, at the will of the operator, to be brought into connection with said line for testing, and a battery normally in the circuit of the line and in the test-circuit thus established, the battery, annunciator and test-receiving instrument being so related that the latter responds to the battery but the annunciator does not, substantially as set forth.

16. In a telephone-exchange system, two or more multiple switchboards, metallic-circuit lines connected thereto, one side or branch of each line being normally connected at the central office to a wire or connection, and the other side or branch being normally open at the central office, and a battery in said wire or connection in combination with switching devices or means to temporarily disconnect the branch of said line from its said wire or connection, and to connect the two branches with the two branches of another line for conversation, test-receiving instruments, one at each board, and switch-testing devices or means at each board, whereby an operator may, at will connect her test-receiving instrument connected to said wire or connection on one side, on its other side to the open end of any of said metallic-circuit lines, substantially as and for the purpose set forth.

MILO G. KELLOGG.

Witnesses:
LOUIS GOTTSCHALK,
FERD C. GOTTSCHALK.